(12) United States Patent
Shao et al.

(10) Patent No.: US 11,693,380 B1
(45) Date of Patent: Jul. 4, 2023

(54) DISTRIBUTION METHODS AND DISTRIBUTION SYSTEMS FOR GREENSPACE IRRIGATION WATER OF SMART CITIES BASED ON INTERNET OF THINGS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Bin Liu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/818,981

(22) Filed: Aug. 11, 2022

(30) Foreign Application Priority Data

Jul. 12, 2022 (CN) .......................... 202210813721.9

(51) Int. Cl.
*G05B 19/042* (2006.01)
(52) U.S. Cl.
CPC .... *G05B 19/042* (2013.01); *G05B 2219/2625* (2013.01)
(58) Field of Classification Search
CPC ...................... G05B 19/042; G05B 2219/2625
See application file for complete search history.

(56) References Cited

U.S. PATENT DOCUMENTS

2017/0030877 A1   2/2017   Miresmailli et al.
2018/0314949 A1   11/2018  Bender et al.
(Continued)

FOREIGN PATENT DOCUMENTS

AU   2021102845 A4   7/2021
AU   2021103170 A4   11/2021
(Continued)

OTHER PUBLICATIONS

White Paper on Urban Brain Development, Smart City Standard Working Group of National Beacon Commission, 2022, 59 pages.
(Continued)

*Primary Examiner* — Chad G Erdman
(74) *Attorney, Agent, or Firm* — Metis IP LLC

(57) ABSTRACT

The present disclosure provides a distribution method and a distribution system for greenspace irrigation water of a smart city based on an Internet of Things. The method includes obtaining historical monitoring information of a plurality of greenspaces in a target area within a historical time period from the urban monitoring object platform, determining historical growth information of the plurality of greenspaces within the historical time period based on the historical monitoring information of the plurality of greenspaces, determining target irrigation parameters of each greenspace in a first future time period based on the historical growth information, generating an irrigation control instruction for irrigating each greenspace based on target irrigation parameters, and sending the irrigation control instruction to an irrigation object platform through a sensor network platform, an irrigation object platform being configured to irrigate the each greenspace in response to the irrigation control instruction.

4 Claims, 9 Drawing Sheets

(56) References Cited

U.S. PATENT DOCUMENTS

| | | |
|---|---|---|
| 2021/0235641 A1 | 8/2021 | Boudreau et al. |
| 2021/0265066 A1 | 8/2021 | Berg et al. |
| 2022/0183243 A1 | 6/2022 | Gilbert et al. |

FOREIGN PATENT DOCUMENTS

| | | | | |
|---|---|---|---|---|
| AU | 2021103540 A4 | 3/2022 | | |
| AU | 2021103425 A4 | 5/2022 | | |
| CN | 106688827 A | 5/2017 | | |
| CN | 106978839 A | 7/2017 | | |
| CN | 107578116 A | 1/2018 | | |
| CN | 107862686 A | 3/2018 | | |
| CN | 207476524 U | 6/2018 | | |
| CN | 108612172 A | 10/2018 | | |
| CN | 105145286 B | 11/2018 | | |
| CN | 110209077 A | * | 9/2019 | ......... G05B 19/0428 |
| CN | 110839519 A | 2/2020 | | |
| CN | 111369093 A | 7/2020 | | |
| CN | 111639904 A | 9/2020 | | |
| CN | 112739198 A | 4/2021 | | |
| CN | 113229123 A | 8/2021 | | |
| CN | 113469248 A | 10/2021 | | |
| CN | 113575388 A | 11/2021 | | |
| CN | 113920288 A | 1/2022 | | |
| CN | 114488988 A | 5/2022 | | |

OTHER PUBLICATIONS

Shao, Zehua, Exploration and Research on the Structure of Internet of Things, Internet of Things Technologies Reliable Transmission, 2015, 10 pages.

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

He, Wenxiang et al., Research and Design of Intelligent Home Potted Plant System Technology, Modern Computer, 27(23): 167-170, 2021.

Gai, Zhiyuan, Study on Irrigation Strategy and Root Distribution Prediction Model of Winter Wheat under Deep Irrigation. China Academic Journal Electronic Publishing House, 2019, 70 pages.

First Office Action in Chinese Application No. 202210813721.9 dated Aug. 16, 2022, 18 pages.

* cited by examiner

300

310
Obtaining, by the urban management platform, historical monitoring information of a plurality of greenspaces in the target area within a historical time period from the urban monitoring object platform through the sensor network platform

320
Determining, by the urban management platform, the historical growth information of a plurality of greenspaces within the historical time period based on the historical monitoring information of the plurality of greenspaces

330
Determining, by the urban management platform, target irrigation parameters of each greenspace within a first future time period based on the historical growth information

340
Generating, by the urban management platform, a irrigation control instruction for irrigating the each greenspace based on the target irrigation parameters

350
Sending, by the urban management platform, the irrigation control instruction to the irrigation object platform through the sensor network platform, the device management platform being configured to irrigate each greenspace in response to the irrigation control instruction

510 — For the each greenspace, obtaining, by the urban management platform, the historical irrigation parameters of a greenspace within the historical time period through the irrigation object platform and obtaining, by the urban management platform, the historical environment information of the greenspace within the historical time period through the urban monitoring object platform 520 — Determining, by the urban management platform, the first growth information of the green space within the first future time period through a growth condition prediction model based on the historical growth information, historical irrigation parameters, and the historical environment information 530 — Determining, by the urban management platform, the target irrigation parameters of the each greenspace within the first future time period based on the first growth information corresponding to the each greenspace

Obtaining, by the urban management platform, the preset total amount of irrigation in the target area within the first future time period — 710

Determining, by the urban management platform, target irrigation parameters corresponding to the each greenspace combined with a preset algorithm based on the preset total amount of irrigation and the first growth information of each greenspace — 720

810 — Determining, by the urban management platform, a plurality of candidate irrigation schemes of the plurality of greenspaces based on the preset total amount of irrigation and the first growth information corresponding to the each greenspace, and each candidate irrigation scheme including a set of candidate irrigation parameters for irrigating the each greenspace 820 — Performing, by the urban management platform, at least one round of iterative updation on a plurality of candidate irrigation schemes through the preset algorithm until satisfying preset conditions, a plurality of candidate irrigation schemes after iteratively updating converging to the target irrigation scheme, and the target irrigation scheme including a set of target irrigation parameters for irrigating the each greenspace within the first future time period

910 — Obtaining, by the urban management platform, the preset total amount of irrigation in the target area within the first future time period 920 — Determining, by the urban management platform, a plurality of candidate irrigation schemes of a plurality of greenspaces based on the preset total amount of irrigation and the first growth information corresponding to each greenspace 930 — Determining, by the urban management platform, the target environment information of each greenspace within a second future time period 940 — For the each candidate irrigation scheme, after irrigating a plurality of greenspaces based on the candidate irrigation scheme, determining, by the urban management platform, second growth information of each greenspace within the second future time period through the growth condition prediction model based on the candidate irrigation scheme, the target environment information, and the first growth information 950 — Determining, by the urban management platform, the growth promotion value corresponding to the candidate irrigation scheme based on the second growth information of the each greenspace 960 — Determining, by the urban management platform, the target irrigation scheme of the plurality of greenspaces based on the growth promotion value corresponding to the each candidate irrigation scheme

DISTRIBUTION METHODS AND DISTRIBUTION SYSTEMS FOR GREENSPACE IRRIGATION WATER OF SMART CITIES BASED ON INTERNET OF THINGS

CROSS-REFERENCE TO RELATED APPLICATIONS

This application claims priority to Chinese Patent Application No. 202210813721.9, filed on Jul. 12, 2022, the contents of which are hereby incorporated by reference to its entirety.

TECHNICAL FIELD

The present disclosure relates to a field of irrigation water distribution, in particular to a distribution method and distribution system for greenspace irrigation water of a smart city based on an Internet of Things.

BACKGROUND

In urban construction, greenspace is an indispensable part of improving urban ecology and protecting urban environment. Scientific conservation of greenspace is the key to ensuring the normal growth of greenspace. However, a large amount of irrigation water is often wasted in the process of maintaining greenspace.

Therefore, there is a need for a distribution method and distribution system for greenspace irrigation water of a smart city based on an Internet of Things to scientifically distribute irrigation water. This can ensure that the greenspace achieves the best growth state while saving irrigation water resources.

SUMMARY

According to one or more embodiments of the present disclosure, a distribution method for greenspace irrigation water of a smart city based on an Internet of Things is provided. The distribution method may include obtaining historical monitoring information of a plurality of greenspaces in a target area within a historical time period from the urban monitoring object platform through a sensor network platform, determining historical growth information of the plurality of greenspaces within the historical time period based on the historical monitoring information of the plurality of greenspaces, determining target irrigation parameters of each greenspace in a first future time period based on the historical growth information, generating an irrigation control instruction for irrigating each greenspace based on the target irrigation parameters, and sending the irrigation control instruction to an irrigation object platform through the sensor network platform, and an irrigation object platform is configured to irrigate the each greenspace in response to the irrigation control instruction.

According to one or more embodiments of the present disclosure, a distribution system for greenspace irrigation water of a smart city based on an Internet of Things is provided. The distribution system may include a user platform, a service platform, an urban management platform, a sensor network platform, an urban monitoring object platform, and an irrigation object platform. The urban management platform is configured to perform the operations including: obtaining historical monitoring information of a plurality of greenspaces in a target area within a historical time period from the urban monitoring object platform through a sensor network platform, determining historical growth information of the plurality of greenspaces within the historical time period based on the historical monitoring information of the plurality of greenspaces, determining target irrigation parameters of each greenspace in a first future time period based on the historical growth information, generating an irrigation control instruction for irrigating each greenspace based on the target irrigation parameters, and sending the irrigation control instruction to an irrigation object platform through a sensor network platform, and an irrigation object platform is configured to irrigate the each greenspace in response to the irrigation control instruction.

According to one of the embodiments of the present disclosure, a non-transitory computer-readable storage medium is provided, the storage medium may store a computer instruction, after reading the computer instruction of the storage medium, a computer may execute a distribution method for greenspace irrigation water of a smart city based on an Internet of any one of the embodiments mentioned above.

BRIEF DESCRIPTION OF THE DRAWINGS

The present disclosure will be further described in the form of exemplary embodiments, which will be described in detail by the accompanying drawings. These embodiments are not limited, in these embodiments, the same number denotes the same structure, wherein:

FIG. 3 is an exemplary flowchart illustrating a distribution method for greenspace irrigation water of the smart city based on the Internet of Things according to some embodiments of the present disclosure.

FIG. 5 is an exemplary flowchart for determining target irrigation parameters according to some embodiments of the present disclosure.

FIG. 7 is an exemplary flowchart for determining target irrigation parameters according to some embodiments of the present disclosure.

FIG. 8 is another exemplary flowchart for determining target irrigation parameters according to some embodiments of the present disclosure.

FIG. 9 is another exemplary flowchart for determining target irrigation parameters according to some embodiments of the present disclosure.

DETAILED DESCRIPTION

To more clearly explain the technical scheme of the embodiments of the present disclosure, the accompanying drawings required in the descriptions of the embodiment will be briefly introduced below. Obviously, the drawings in the following descriptions are only some examples or embodiments of the disclosure. For those skilled in the art, the present disclosure may also be applied to other similar situations according to these drawings without paying creative labor. Unless it is obvious or explained in the language environment, the same number in drawings represents the same structure or operation.

It should be understood that the "system," "device," "unit" and/or "module" used herein is a method for distinguishing different components, elements, parts, sections, or assemblies of different levels. However, the terms may be displaced by another expression if they achieve the same purpose.

As shown in the present specification and claims, unless the context clearly prompts the exception, the words "one," "a," "an" and/or "the" do not specifically refer to singular, and the plural may be included. Generally speaking, the terms "comprise" and "include" only imply that the clearly identified steps and elements are included, and these steps and elements do not constitute an exclusive list, and the method or device may also include other steps or elements.

A flowchart is used in the present disclosure to explain the operation performed by the system according to the embodiments of the present disclosure. It should be understood that the foregoing or following operations may not necessarily be performed exactly in instruction. Instead, a plurality of steps may be processed in reverse or simultaneously. At the same time, other actions may be added to these procedures, or a step or steps may be removed from these procedures.

Figure 1:
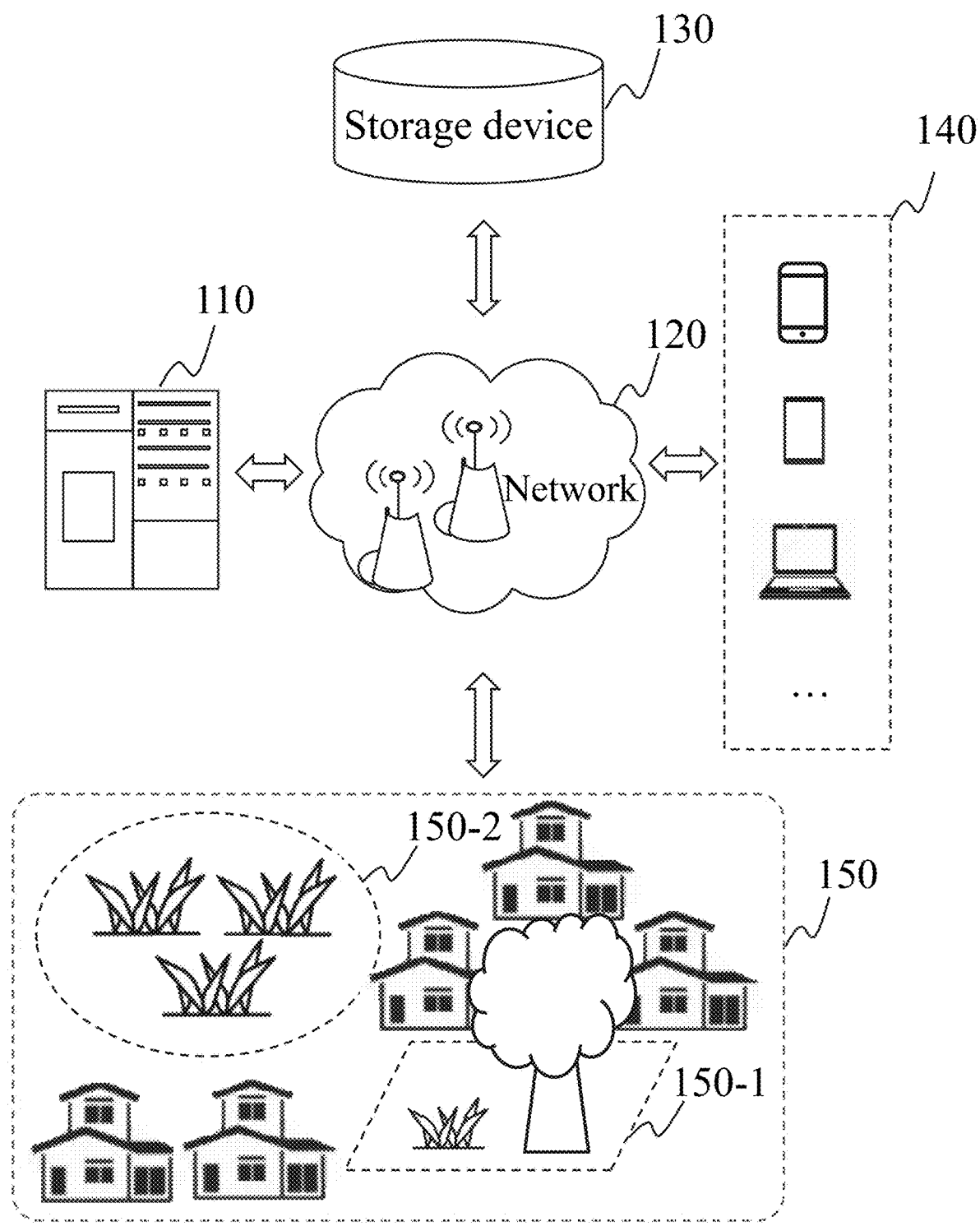
FIG. 1 is an application scenario schematic diagram illustrating a distribution system for greenspace irrigation water of a smart city based on an Internet of Things according to some embodiments of the present disclosure.

FIG. 1 is an application scenario schematic diagram illustrating a distribution system for greenspace irrigation water of a smart city based on an Internet of Things according to some embodiments of the present disclosure.

In some embodiments, an application scenario 100 of a distribution system for greenspace irrigation water of the smart city based on the Internet of Things may include a processing device 110, a network 120, a storage device 130, a terminal 140, and a target area 150. In some embodiments, components in the application scenario 100 may connect and/or communicate with each other via the network 120 (e.g., a wireless connection, a wired connection, or a combination thereof). For example, the processing device 110 may be connected to the storage device 130 through the network 120.

The target area 150 refers to an area where the irrigation water distribution is required. The target area 150 may include the plurality of greenspaces, for example, a greenspace 150-1, a greenspace 150-2. A Greenspace refers to a green land specially used by a city to improve ecology, protect environment, provide residents with recreational areas and beautify the landscape. In some embodiments, data (e.g., historical monitoring information, historical irrigation parameters, etc.) required for greenspace irrigation water distribution of the smart city based on the Internet of Things may be obtained through data acquisition devices (e.g., image acquisition devices, water quantity monitoring devices, etc.) installed on the greenspaces 150-1 and the greenspace 150-2.

In some embodiments, the processing device 110 may be directly connected to the storage device 130 and the terminal 140, and may exchange information and/or data through the network 120 to access information and/or data. For example, the processing device 110 may obtain the historical monitoring information of the greenspace through the network 120. The processing device 110 may obtain the historical monitoring information, historical irrigation parameters, historical environment information, etc. stored in the storage device 130 through the network 120. The processing device 110 may send an irrigation control instruction to the terminal 140 via the network 120. In some embodiments, the processing device 110 may process the information and/or data related to the application scenario 100 to perform one or more functions described in the present disclosure. For example, the processing device 110 may determine historical growth information of the plurality of greenspaces within a historical time period based on the historical monitoring information of the greenspaces.

It should be noted that the application scenario 100 is merely provided for illustrative purpose, and is not intended to limit the scope of the present disclosure. For Those skilled in the art, various modifications or changes may be made based on the description of the present disclosure. For example, the application scenario 100 of the distribution system for greenspace irrigation water of Smart city based on Internet of Things may achieve similar or different functions on other devices. However, such changes and modifications do not depart from the scope of the present disclosure.

Figure 2:
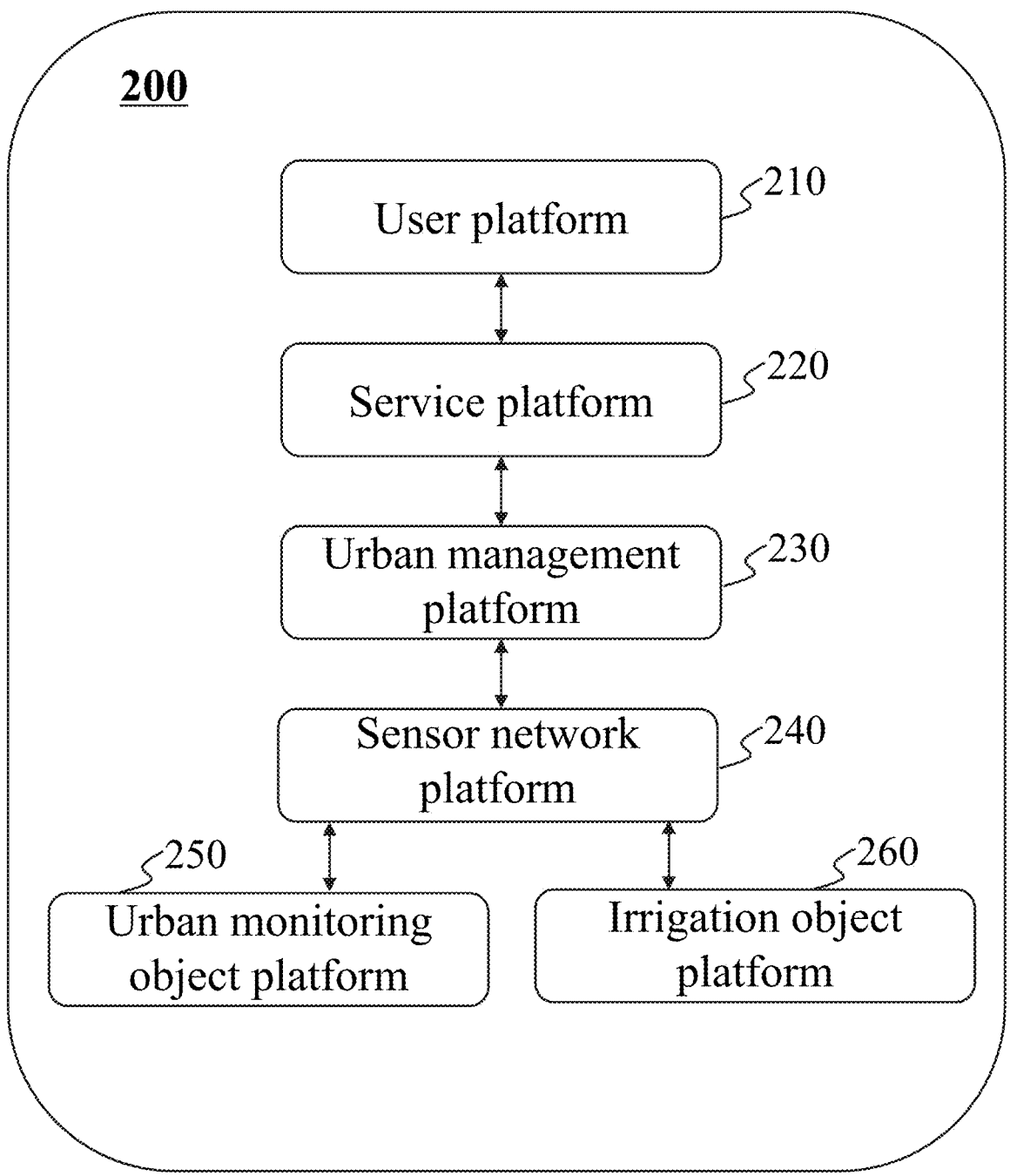
FIG. 2 is a schematic diagram illustrating a distribution system for greenspace irrigation water of the smart city based on the Internet of Things according to some embodiments of the present disclosure.

FIG. 2 is a schematic diagram illustrating a distribution system for greenspace irrigation water of the smart city based on the Internet of Things according to some embodiments of the present disclosure.

A distribution system 200 for greenspace irrigation water of the smart city based on the Internet of Things may be achieved through the Internet of Things.

An Internet of Things system is an information processing system that includes but is not limited to some or all of a user platform, a service platform, a management platform, a sensor network platform, an urban monitoring object platform, and an object platform. The user platform refers to a user-led platform that may obtain user's needs and feed the information back to the user. The service platform refers to a platform that may provide user with input and output services. The management platform may realize co-ordination, and may coordinate connection and cooperation between various functional platforms (such as the sensor network platform, the object platform). The management platform gathers information of the Internet of Things operation system, and may provide a perception management and control management function for the Internet of Internet operation system. The sensor network platform may realize the connection between the management platform and the object platform, and plays the functions of sensing communication of the perception information and sensing communication of the control information. The object platform is a functional platform for generating perception information and executing control information.

The information processing in the Internet of Things system may be divided into a process flow of perception information and the process flow of control information, and the control information may be the information generated based on the perception information. The processing of perception information is that the object platform obtains the perception information and transmits the perception information to the management platform through the sensor network platform. The control information is sent by the management platform to the object platform through the sensor network platform, thereby realizing the control of the corresponding object.

As shown in FIG. 2, the distribution system 200 for greenspace irrigation water of the smart city based on the Internet of Things may include a user platform 210, a service platform 220, an urban management platform 230, a sensor network platform 240, an urban monitoring object platform 250, and an irrigation object platform 260.

The user platform 210 may be configured as a terminal device interacting with the user. The user platform 210 may be configured to receive information input by the user, generate instructions according to the information and send the instructions to the service platform 220, and display the information sent by the service platform 220 to the user. The user may refer to a manager or a user of the distribution system for greenspace irrigation water of the smart city based on the Internet of Things.

The service platform 220 may be configured as a first server. The service platform 220 may be configured to receive the instructions sent by the user platform, process them, and send them to the urban management platform 230, and obtain the information required by the user from the urban management platform 230 and send the information to the user platform 210.

The urban management platform 230 may be configured as a second server and memory. The urban management platform 230 may be configured to receive the instructions sent by the service platform 220 and control the operation of the irrigation object platform 260 according to the instructions, receive and store the information sent by the urban monitoring object platform 250, and also store urban greenspace information. The urban greenspace information may include location information, and area information of each greenspace, and type information and quantity information of vegetation in the greenspace in city.

The sensor network platform 240 may be configured as a communication network and gateway for the urban management platform 230 to interact with the urban monitoring object platform 250 and the irrigation object platform 260. For example, the urban management platform 230 may obtain historical monitoring information of the plurality of greenspaces in a target area within the historical time period from the urban monitoring object platform 250 through the sensor network platform 240. The urban management platform 230 may further send the irrigation control instruction to the irrigation object platform 260 through the sensor network platform 240.

The urban monitoring object platform 250 may be configured with a plurality of data collection devices. The data collection devices may include, but are not limited to, a camera device, a temperature sensor, a light sensor, a wind sensor, and a rainfall statistics device. The information that may be collected by the urban monitoring object platform 250 includes, but is not limited to, image information, temperature information, precipitation information, wind information, illumination information, etc. The collected information may be transmitted to the urban management platform 230.

The irrigation object platform 260 may be configured as a smart irrigation device that performs irrigation operation. The irrigation object platform 260 may receive a control instruction of the urban management platform 230 and execute the irrigation operation according to the content of the instruction, and may send information related to the irrigation operation to the urban management platform 230 through the sensor network platform 240. Specifically, the information related to the irrigation operation may include the information such as irrigation time, irrigation water amount, etc.

It should be understood that the above platforms are merely simple examples of the relevant platforms mainly involved in the present disclosure, and do not represent the display of all relevant content of the present disclosure, and there are some platforms and units that are not shown in this schematic diagram. Moreover, the above platforms and units are not completely independent, and may further be mutually involved crosswise.

It should be understood that the system and its platforms shown in FIG. 2 may be realized in a plurality of ways. For example, in some embodiments, the system and its platforms may be realized in hardware, software, or a combination of software and hardware. The hardware part may be realized by using dedicated logic, and the software part may be stored in a memory and executed by a suitable instruction execution system, such as a microprocessor or a specially designed hardware. Those skilled in the art may appreciate that the methods and systems described above may be realized by using computer-executable instructions and/or control code contained in a processor, for example, such code is provided on a carrier medium such as a magnetic disk, CD or DVD-ROM, a programmable memory such as a read only memory (firmware), or a data carrier such as an optical or electronic signal carrier. The system and its platforms of the present disclosure may not only be realized by hardware circuits such as very large scale integrated circuits or gate arrays, semiconductors such as logic chips, transistors, etc., or programmable hardware devices such as field programmable gate arrays, programmable logic devices, etc., but also be realized by, for example, software executed by various types of processors, and also be implemented by a combination of the above-mentioned hardware circuits and software (e.g., firmware).

It should be noted that the above descriptions of displaying candidate items, determining the system and platform is merely for convenience of descriptions, and does not limit the present disclosure to the scope of the illustrated embodiments. Understandably, for those skilled in the art, after understanding the principle of the system, it is possible to arbitrarily combine each platform, or form a subsystem to connect with other platforms without departing from the principle. In some embodiments, the user platform, service platform, urban management platform, sensor network platform, urban monitoring object platform and object platform disclosed in FIG. 2 may be different platforms in the system, or may be a platform to realize above functions of two or more platforms. For example, each platform may share one storage module, and each platform may respectively have the own storage module. Such deformations are all within the protection scope of the present disclosure.

FIG. 3 is an exemplary flowchart illustrating a distribution method for greenspace irrigation water of the smart city based on the Internet of Things according to some embodiments of the present disclosure. As shown in FIG. 3, a process 300 may include the following steps.

Step 310, the urban management platform obtains the historical monitoring information of the plurality of greenspaces in the target area within the historical time period from the urban monitoring object platform through the sensor network platform.

The target area may refer to a certain area covered by the distribution method for greenspace irrigation water of the smart city based on the Internet of Things. For example, the target area may be an entire city. As another example, the target area may be an administrative district or a district in a city.

The historical time period may refer to a period of time before the time point when the greenspace is irrigated. A duration of the historical time period may be preset. The historical time period may include a plurality of time points, and time intervals between the plurality of time points may be preset.

The historical monitoring information may be monitoring information of greenspaces at the plurality of time points within the historical time period. The historical monitoring information may include the image information, video information, etc. of the greenspace within the historical time period. The historical monitoring information may include other information, such as the type information and quantity information of vegetation in the greenspace within the historical time period. In some embodiments, the historical monitoring information may be a sequence based on time, which includes monitoring information at the plurality of time points within the historical time period. The historical monitoring information may be obtained through a plurality of ways. For example, the image information, the video information, etc. within the historical time period may be obtained by shooting the plurality of greenspaces in the target area through a camera device configured on the urban monitoring object platform. The type information and quantity information of vegetation may be obtained from the memory of the urban management platform.

Step 320, the urban management platform determines the historical growth information of the a plurality of greenspaces within the historical time period based on the historical monitoring information of the plurality of greenspaces.

The historical growth information may refer to growth information of vegetation in the greenspace within the historical time period. The historical growth information may be represented through a historical growth score. The historical growth score may be a score within a preset range, and the higher the score is, the better the growth condition of the greenspace is. For example, the historical growth score may be a score within a range of 0 to 100. In some embodiments, the historical growth information may be a sequence based on time, and the sequence may include the environment information at the plurality of time points within the historical time period. When being represented through the historical growth score, the historical growth information may be a sequence of historical growth scores at the plurality of time points within the historical time period.

In some embodiments, the historical monitoring information of the plurality of greenspaces may be analyzed to determine the historical growth information of the plurality of greenspaces within the historical time period.

In some embodiments, the urban management platform may process the historical monitoring information based on an image recognition model to determine the historical growth scores of the plurality of greenspaces within the historical time period. Descriptions regarding the image recognition model may be found in FIG. 4 and its corresponding descriptions thereof, which will not be repeated herein.

Step 330, the urban management platform determines target irrigation parameters of each greenspace within the first future time period based on the historical growth information.

The first future time period may refer to a fixed duration of time in the future. The length of the first future time period may be preset. For example, the first future time period may be one week in the future.

The target irrigation parameters may refer to operation parameters when irrigating the each greenspace. The target irrigation parameters may include one or more of irrigation water amount, irrigation methods, irrigation time, etc. Irrigation methods include but are not limited to drip irrigation, sprinkler irrigation, etc.

In some embodiments, it may perform modeling or use a plurality of data analysis algorithms, such as regression analysis, discriminant analysis, etc., to analyze and process the historical growth information to obtain the target irrigation parameters of the each greenspace within the first future time period.

In some embodiments, for the each greenspace, the urban management platform may obtain the historical irrigation parameters of the greenspace within the historical time period through the irrigation object platform and obtain historical environment information of the greenspace within the historical time period through the urban monitoring object platform, determine first growth information of the greenspace within the first future time period through a growth condition prediction model based on the historical growth information, historical irrigation parameters, and the historical environment information, and determine the target irrigation parameters of the each greenspace within the first future time period based on the first growth information corresponding to the each greenspace. More descriptions regarding the above-mentioned embodiments may be found in FIG. 5 and its relevant description thereof.

Step 340, the urban management platform generates the irrigation control instruction for irrigating the each greenspace based on the target irrigation parameters.

The irrigation control instruction may refer to an instruction to control the irrigation device to irrigate the greenspace. The urban management platform may generate a corresponding irrigation control instruction based on the target irrigation parameters of the each greenspace.

Step 350, the urban management platform sends the irrigation control instruction to the irrigation object platform through the sensor network platform, and the irrigation object platform is configured to irrigate the each greenspace in response to the irrigation control instruction.

Figure 4:
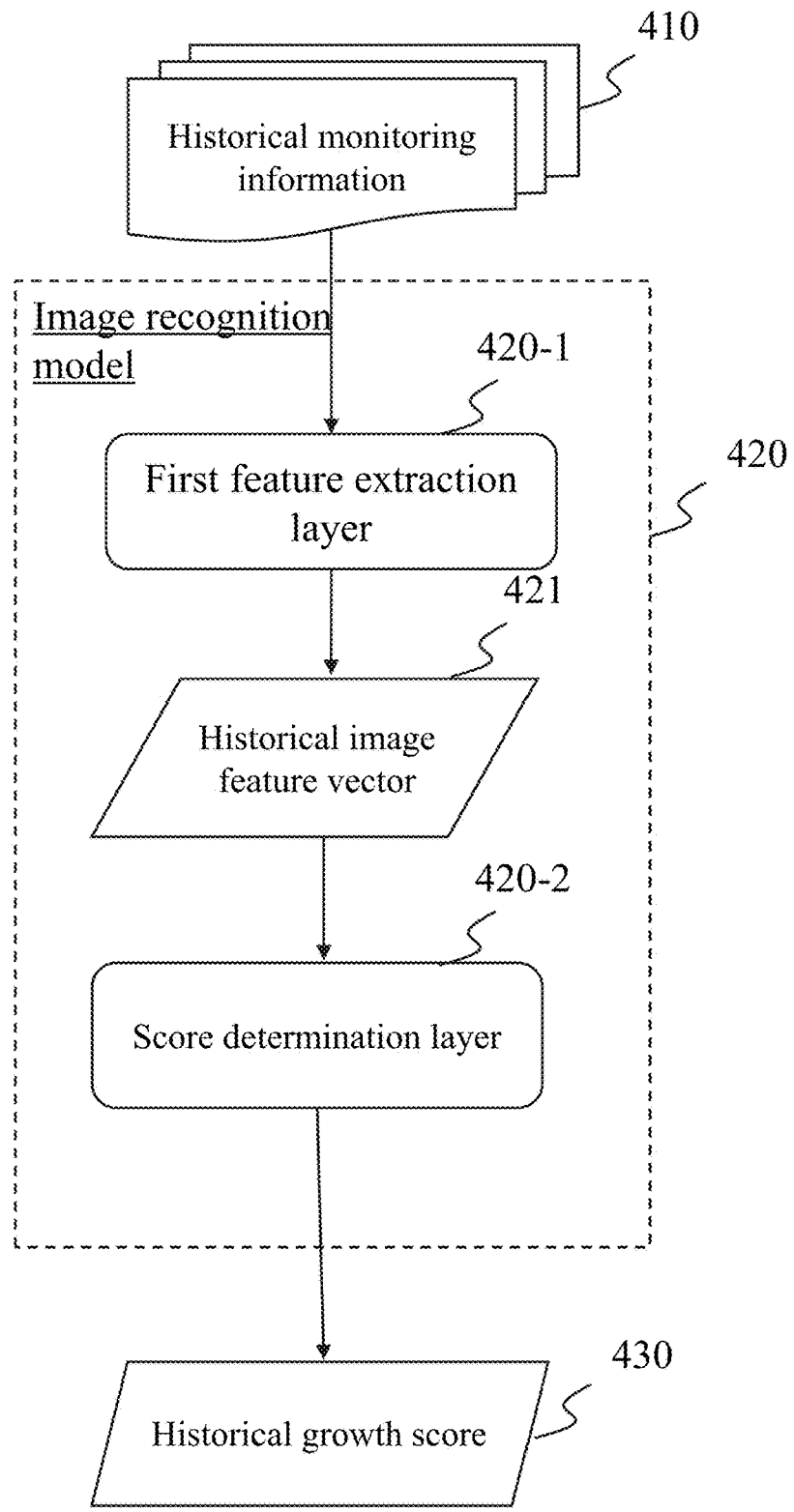
FIG. 4 is a schematic diagram illustrating an image recognition model according to some embodiments of the present disclosure.

FIG. 4 is a schematic diagram illustrating an image recognition model according to some embodiments of the present disclosure.

In some embodiments, an image recognition model may process the historical monitoring information of a greenspace to determine the historical growth information of the greenspace within the historical time period. As shown in FIG. 4, the image recognition model 420 may include a first feature extraction layer 420-1 and a score determination layer 420-2 connected in sequence. The input of the image recognition model 420 may include historical monitoring information 410 of a greenspace within a historical time period, and the output of the image recognition model 420 may include the historical growth score 430 of the greenspace within the historical time period.

In some embodiments, the first feature extraction layer may process the historical monitoring information of a greenspace within the historical time period to determine a historical image feature vector of the greenspace within the historical time period. When the historical monitoring information is the image information, the features of the image information (for example, the color and height of vegetation, etc.) may be extracted to determine the historical image feature vector of the greenspace within the historical time period. Each dimension of the historical image feature vector may correspond to one image feature. The first feature extraction layer may be a convolutional neural network model. As shown in FIG. 4, the input of the first feature extraction layer 420-1 may be the historical monitoring information 410 of a greenspace within a historical time period, and the output of the first feature extraction layer 420-1 may be a historical image feature vector 421 of the greenspace.

The score determination layer may process the historical image feature vector of a greenspace within the historical time period to determine the historical growth scores of the greenspace within the historical time period. The score determination layer may be a deep neural network model. As shown in FIG. 4, the input of the score determination layer 420-2 may be the historical image feature vector 421 of a greenspace within the historical time period, and the output of the score determination layer 420-2 may be the historical growth score 430 of the greenspace within the historical time period.

In some embodiments, the image recognition model may be determined by jointly training the first feature extraction layer and the score determination layer. The training sample may include sample monitoring information of a sample greenspace within the sample time period, and a label of the training sample may be the growth information of the sample time period. The label may be obtained by manually labeling sample monitoring information of the sample greenspace within the sample time period. It should be understood that the vegetation types of the sample greenspace and the greenspace to be predicted should be the same or the same category, for example, the vegetation types of the sample greenspace and the greenspace to be predicted are both ryegrasses. Multiple training samples are input into an initial first feature extraction layer, and the output of the initial first feature extraction layer is input to an initial score determination layer. A loss function is constructed based on the output of the initial score determination layer and labels. The parameters of the initial first feature extraction layer and the initial score determination layer are iteratively updated based on the loss function, until the preset conditions are met, and the training ends. The parameters of the first feature extraction layer and the score determination layer may be determined to obtain a trained image recognition model. Preset conditions may include, but are not limited to, a loss function converging, a loss function value being less than a preset value, or a number of training iterations reaching a threshold, etc.

In some embodiments of the present disclosure, the historical growth information of the each greenspace within a historical time period may be determined through the image recognition model, thereby reducing the cost of manual judgment and improving processing efficiency. In still other embodiments of the present disclosure, different data may be processed through a multi-layer structure of the image recognition model, thereby further improving an accuracy of calculation result of the image recognition model.

FIG. 5 is an exemplary flowchart for determining target irrigation parameters according to some embodiments of the present disclosure. As shown in FIG. 5, a process 500 may include the following steps.

Step 510, for each greenspace, the urban management platform obtains the historical irrigation parameters of the greenspace within the historical time period through the irrigation object platform and obtains the historical environment information of the greenspace within the historical time period through the urban monitoring object platform.

The historical irrigation parameters refer to the irrigation parameters of the greenspace within the historical time period. Merely by way of example, the historical irrigation parameters may be irrigation parameters of a greenspace irrigated in a previous month. The historical irrigation parameters include: the irrigation frequency being 3 days/time, and the average irrigation water amount per time is 9-10 tons/mu. In some embodiments, the historical irrigation parameters may be a sequence based on time, and the sequence may include the irrigation parameters at a plurality of time points within the historical time period.

The historical irrigation parameters may be obtained through the irrigation object platform. For example, the urban management platform may obtain the historical irrigation parameters from historical data of the irrigation object platform.

The historical environment information refers to the environmental information of the greenspace within the historical time period. For example, the historical environment information may include rainfall, temperature, humidity, illumination intensity, wind force, etc. of the area where the green space is located within the historical time period.

The historical environment information may be obtained through the urban monitoring object platform. For example, the urban monitoring object platform may obtain the historical environment information from the historical data according to the needs of the urban management platform.

Step 520, the urban management platform determines the first growth information of the greenspace within the first future time period through the growth condition prediction model based on the historical growth information, the historical irrigation parameters, and the historical environment information.

The first growth information may refer to growth information of the greenspace within the first future time period. Similar to the historical growth information, the first growth information may be represented through a first growth score. Merely by way of example, the first growth score may also be a vacore within the range of 0 to 100.

In some embodiments, the growth condition prediction model may process the growth information, irrigation parameters, and environment information of a greenspace within a time period to determine the first growth information within the next time period corresponding to the time period.

The growth condition prediction model may be configured to determine the first growth information of the greenspace within the first future time period. The growth prediction model may include, but is not limited to, a convolutional neural network, a deep neural network, or any combinations thereof.

For the each greenspace, the growth condition prediction model may process the historical growth information, historical irrigation parameters, and historical environment information to determine the first growth information of the greenspace within the first future time period. The growth condition prediction model may include, but is not limited to, a convolutional neural network, a deep neural network, or any combinations thereof. The input of the growth condition prediction model may include the historical growth information, historical irrigation parameters, and historical environmental information of a greenspace. The historical growth information, historical irrigation parameters, and historical environmental information may be sequences based on time. The output of the growth condition prediction model may include the first growth information of the greenspace within the historical time period.

In some embodiments, the growth condition prediction model may be obtained by training. An initial growth condition prediction model may be trained based on a plurality sets of labeled training samples. The training samples may include sample growth information, sample irrigation parameters, and sample environment information of the sample greenspace within a first sample time period. The label may be the growth information of the sample greenspace within a second sample time period, and the first sample time period is earlier than the second sample time period. The label may be obtained by manually labeling the sample monitoring information of the sample greenspace within the second sample time period, or by processing the sample monitoring information through an aforementioned image recognition model. It should be understood that the vegetation types of the sample greenspace and the greenspace to be predicted should be the same or of the same category. A plurality of training samples are input into the initial growth condition prediction model. The loss function is constructed based on the output of the initial growth condition prediction model and labels, and the parameters of the initial growth condition prediction model are iteratively updated based on the loss function. When the trained model satisfies the preset conditions, the training ends, and the trained growth condition prediction model is obtained. The preset conditions may include, but are not limited to, the loss function converging, the loss function value being less than the preset value, or the number of training iterations reaching the threshold, etc.

Figure 6:
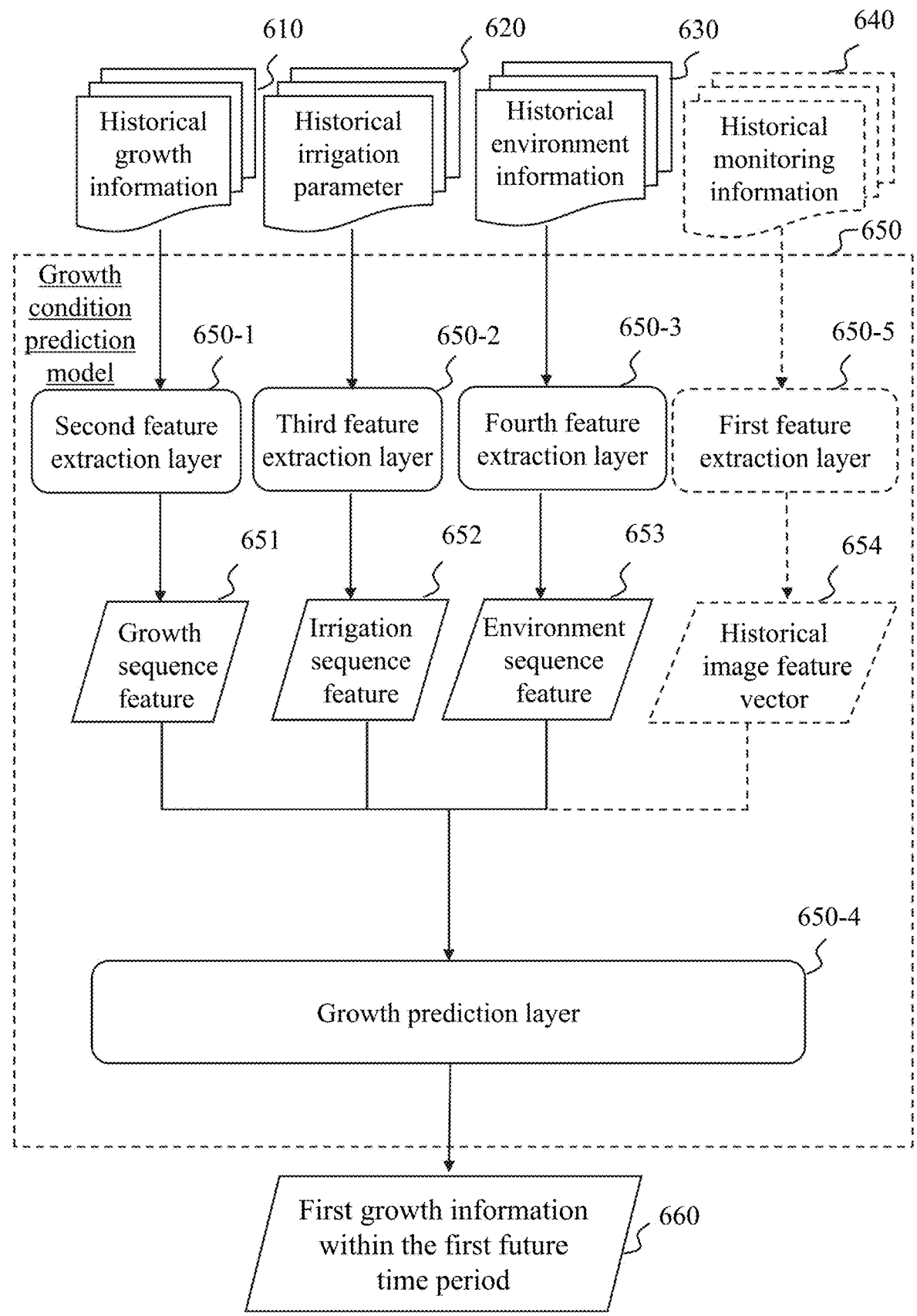
FIG. 6 is a schematic diagram illustrating a growth condition prediction model according to some embodiments of the present disclosure.

In some embodiments, the growth condition prediction model may further be a custom model. As shown in FIG. 6, the growth condition prediction model 650 may include a second feature extraction layer 650-1, a third feature extraction layer 650-2, a fourth feature extraction layer 650-3, and a growth prediction layer 650-4.

In some embodiments, a second feature extraction layer may process the historical growth information to determine a growth sequence feature of the greenspace within the historical time period. The second feature extraction layer may be the deep neural network model. As shown in FIG. 6, an input of the second feature extraction layer 650-1 may be historical growth information 610, and an output of the second feature extraction layer 650-1 may be a growth sequence feature 651. The growth sequence feature may refer to an obtained sequence feature after performing a feature extraction on the historical growth information.

In some embodiments, a third feature extraction layer may process the historical irrigation parameters to determine an irrigation sequence feature of the greenspace within the historical time period. The third feature extraction layer may be the deep neural network model. As shown in FIG. 6, an input of the third feature extraction layer 650-2 may be historical irrigation parameters 620, and an output of the third feature extraction layer 650-2 may be an irrigation sequence feature 652. The irrigation sequence feature may refer to the obtained sequence feature after performing a feature extraction to the historical irrigation parameters.

In some embodiments, a fourth feature extraction layer may process the historical environment information to determine an environment sequence feature of the greenspace within the historical time period. The fourth feature extraction layer may be the deep neural network model. As shown in FIG. 6, an input of the fourth feature extraction layer 650-3 may be a historical environment information 630, and an output of the fourth feature extraction layer 650-3 may be an environment sequence feature 653. The environment sequence feature may refer to the obtained sequence feature after performing a feature extraction to the historical environment information.

In some embodiments, a growth prediction layer may process the growth sequence feature, irrigation sequence feature, and environment sequence feature to determine the first growth information of the greenspace within the first future time period. The growth prediction layer may be a long short-term memory network model. As shown in FIG. 6, an input of a growth prediction layer 650-4 may include a growth sequence feature 651, an irrigation sequence feature 652, and an environment sequence feature 653, and an output of the growth prediction layer 650-4 may include first growth information 660 of the greenspace within the first future time period.

In some embodiments, the second feature extraction layer, third feature extraction layer, fourth feature extraction layer, and growth prediction layer may be obtained by jointly training. The training sample includes sample growth information, sample irrigation parameters, and sample environment information of the sample greenspace within a third sample time period. The label may be the growth information of the sample greenspace within a fourth sample time period, and the third sample time period is earlier than the fourth sample time period. The label may be obtained by manually labeling the sample monitoring information of the sample greenspace within the sample time period. It should be understood that the vegetation types of the sample greenspace and the greenspace to be predicted should be the same or of the same category, for example, the vegetation types of the sample greenspace and the greenspace to be predicted are both ryegrasses. The sample growth information of the training sample is input into an initial second feature extraction layer, the sample irrigation parameters of the training sample is input into an initial third feature extraction layer, and the sample environment information of the training samples is input into the initial fourth feature extraction layer. Then, the outputs of the initial second feature extraction layer, the initial third feature extraction layer, and the initial fourth feature extraction layer are input into the initial growth prediction layer, and the loss function is constructed based on the output of the initial growth prediction layer and labels. The parameters of each layer of an initial growth condition prediction model are iteratively updated based on the loss function until the preset conditions are met, and the trained growth condition prediction model is obtained. The preset conditions may include, but are not limited to, the loss function converging, the loss function value being less than a preset value, or the number of training iterations reaching a threshold, etc.

As shown in FIG. 6, a growth condition prediction model 650 may further include a first feature extraction layer 650-5.

In some embodiments, the first feature extraction layer may process the historical monitoring information to determine the historical image feature vectors of the plurality of greenspaces. As shown in FIG. 6, an input of the first feature extraction layer 650-5 may be historical monitoring information 640, and an output of the first feature extraction layer 650-5 may be a historical image feature vector 654.

A growth prediction layer 650-4 may process the growth sequence feature 651, the irrigation sequence feature 652, the environment sequence feature 653, and the historical image feature vector 654 to determine the first growth information 660 of the greenspace within the first future time period.

In some embodiments, the parameters of the first feature extraction layer may be obtained by performing transfer learning on the first feature extraction layer in a trained image recognition model. Descriptions regarding the image recognition model may be found in FIG. 4 and its relevant descriptions.

Step 530, the urban management platform determines the target irrigation parameters of the each greenspace within the first future time period based on the first growth information corresponding to the each greenspace.

In some embodiments, it may perform modeling or use the plurality of data analysis algorithms, such as regression analysis, discriminant analysis, etc., to analyze and process the historical growth information to obtain the target irrigation parameters of the each greenspace within the first future time period.

In some embodiments, the urban management platform may obtain a preset total amount of irrigation in the target area within the first future time period, and may determine the target irrigation parameters corresponding to the each greenspace combined with a preset algorithm based on the preset total amount of irrigation and the first growth information of the each greenspace. More descriptions regarding the above-mentioned embodiments may be found in FIG. 7 and its relevant descriptions thereof.

In some embodiments, the urban management platform may further obtain the preset total amount of irrigation in the target area within the first future time period, may determine a plurality of candidate irrigation schemes of the plurality of greenspaces based on the preset total amount of irrigation and the first growth information corresponding to the each greenspace, and each candidate irrigation scheme includes a set of candidate irrigation parameters for irrigating the each greenspace. The urban management platform may determine the target environment information of the each greenspace within a second future time period. For the each candidate irrigation scheme, after irrigating the plurality of greenspaces based on the candidate irrigation scheme, the urban management platform may determine second growth information of the each greenspace within the second future time period through the growth condition prediction model based on the candidate irrigation scheme, the target environment information, and the first growth information. The urban management platform may determine a growth promotion value corresponding to the candidate irrigation scheme based on the second growth information of the each greenspace. The urban management platform may determine a target irrigation schemes of the plurality of greenspaces based on the growth promotion value corresponding to the each candidate irrigation scheme, and the target irrigation scheme includes the set of target irrigation parameters for irrigating the each greenspace within the first future time period. More descriptions regarding the above-mentioned embodiments may be found in FIG. 9 and its relevant descriptions thereof.

Some embodiments of the present disclosure may accurately predict the growth condition of the greenspace through a model based on historical data of greenspace. In this way, more scientific target irrigation parameters may be determined, and irrigation water resources and human resources responsible for irrigation may be saved under the condition of ensuring a normal growth of the greenspace.

FIG. 7 is an exemplary flowchart for determining target irrigation parameters according to some embodiments of the present disclosure. As shown in FIG. 7, a process 700 may include the following steps.

Step 710, the urban management platform obtains the preset total amount of irrigation in the target area within the first future time period.

The preset total amount of irrigation refers to the total amount of water available for irrigation in the target area within the first future time period.

The preset total amount of irrigation may be obtained from a database of the urban management platform. For example, The preset total amount of irrigation in the database of the urban management platform may be updated periodically (e.g., daily, weekly, etc.) according to known conditions. When there is a data request for obtaining the preset total amount of irrigation, the latest preset total amount of irrigation may be retrieved for subsequent processing.

Step 720, the urban management platform determines the target irrigation parameters corresponding to the each greenspace combined with the preset algorithm based on the preset total amount of irrigation and the first growth information of the each greenspace.

In some embodiments, the urban management platform may use the plurality of preset algorithms to analyze and process the preset total amount of irrigation and the first growth information of the each greenspace to determine the target irrigation parameters corresponding to the each greenspace. For example, the preset algorithms may include the regression analysis, discriminant analysis, etc.

In some embodiments, the urban management platform may determine the plurality of candidate irrigation schemes of the plurality of greenspaces based on the preset total amount of irrigation and the first growth information corresponding to the each greenspace, and each candidate irrigation scheme includes a set of candidate irrigation parameters for irrigating the each greenspace. For each candidate irrigation scheme, the urban management platform performs at least one round of iterative updation on the candidate irrigation scheme through the preset algorithm to determine the growth promotion value of the candidate irrigation scheme within the second future time period. The urban management platform determines the target irrigation scheme of the plurality of greenspaces based on the growth promotion value corresponding to the each candidate irrigation scheme, and the target irrigation scheme includes a set of target irrigation parameters for irrigating the each greenspace within the first future time period. More descriptions regarding the above-mentioned embodiments may be found in FIG. 8 and its relevant descriptions.

Some embodiments of the present disclosure may perform a more scientific distribution of the planned preset total amount of irrigation water based on the preset total amount of irrigation and the first growth information of the each greenspace.

FIG. 8 is another exemplary flowchart for determining target irrigation parameters according to some embodiments of the present disclosure. As shown in FIG. 8, a process 800 may include the following steps.

Step 810, the urban management platform determines the plurality of candidate irrigation schemes of the plurality of greenspaces based on the preset total amount of irrigation and the first growth information corresponding to the each greenspace, and the each candidate irrigation scheme includes a set of candidate irrigation parameters for irrigating the each greenspace.

The candidate irrigation scheme may refer to a candidate scheme for irrigating the plurality of greenspaces in the target area. The candidate irrigation scheme may include the candidate irrigation parameters of the each greenspace. It should be understood that the total amount of water used by the candidate irrigation parameters of each greenspace of the each candidate irrigation scheme should not exceed the preset total amount of irrigation. The candidate irrigation parameters may refer to the irrigation parameters distributed to each greenspace in the target area in the candidate irrigation scheme. For example, a first irrigation parameter of a greenspace may include an irrigation water amount of 2 tons/mu.

In some embodiments, the urban management platform may perform analysis and processing on the preset total amount of irrigation and the first growth information corresponding to the each greenspace to determine a plurality of candidate irrigation schemes. For example, the preset total amount of irrigation may be distributed based on an area ratio of the each greenspace, and an initial irrigation water amount of the each greenspace may be determined. The irrigation water amount is adjusted based on the plurality of adjustment values corresponding to the first growth information of the each greenspace, and the irrigation water amount of the each greenspace is determined. Then, a plurality of candidate irrigation parameters of each greenspace is determined based on the irrigation water amount of the each greenspace and preset irrigation rules of the each greenspace. For example, based on the area of a greenspace, it is preliminarily determined that the initial irrigation water amount of the greenspace in the next three days is 2 tons. The first growth information of the greenspace is 85 points, and according to the preset correspondence, it may be determined that the adjustment values corresponding to the first growth information are −0.10 tons, −0.15 tons, and −0.20 tons. Based on the irrigation water amount of the greenspace in the next three days being 1.90 tons, 1.85 tons, and 1.80 tons respectively, the irrigation water amount is distributed according to the irrigation rules of the greenspace to determine the plurality of candidate irrigation parameters of the greenspace. In some embodiments, the plurality of candidate irrigation parameters of each greenspace may be combined to determine multiple candidate irrigation schemes.

As another example, the urban management platform may determine, based on the historical data, the historical irrigation scheme corresponding to the time period in which the each greenspace is similar to the preset total amount of irrigation and the first growth information corresponding to each greenspace, and take the aforementioned historical irrigation scheme as a candidate irrigation scheme.

Step 820, the urban management platform performs at least one round of iterative updation on the plurality of candidate irrigation schemes through the preset algorithm until satisfying the preset conditions, the plurality of candidate irrigation schemes after iteratively updating converge to the target irrigation scheme, and the target irrigation scheme includes a set of target irrigation parameters for irrigating the each greenspace within the first future time period.

In some embodiments, the urban management platform may perform the at least one round of iterative updation on the each candidate irrigation scheme through the preset algorithm. For each iteratively updated candidate irrigation scheme, the growth promotion value corresponding to the iteratively updated candidate irrigation scheme is determined based on the iteratively updated candidate irrigation scheme. The growth promotion value may represent overall growth information of all greenspaces within the second future time period. The growth promotion value may be determined based on the second growth information, representing the sum of the second growth scores. The second growth information may represent the growth information of the greenspace within the second future time period. Similar to the historical growth information, the second growth information may be represented through the second growth score. For example, the second growth score may be a value of 0-100. In some embodiments, the iteratively updated candidate irrigation scheme may be processed based on the growth condition prediction model to determine the growth promotion value corresponding to the iteratively updated candidate irrigation scheme. More descriptions regarding the determining the growth promotion value corresponding to the iteratively updated candidate irrigation scheme may be found in FIG. 9 and its relevant descriptions thereof.

For each candidate irrigation scheme, during a process of iteratively updating the candidate irrigation scheme, the candidate irrigation parameters of the candidate irrigation scheme may correspond to a multi-dimensional increment. The multi-dimensional increment may refer to an adjustment range of the irrigation water amount of each greenspace included in the candidate irrigation scheme in each iteration.

In the first round of iteration, the initial candidate irrigation scheme may be updated based on an initial multi-dimensional increment to obtain the updated candidate irrigation scheme. The updated candidate irrigation scheme is determined as the candidate irrigation scheme to be processed, and the initial multi-dimensional increment is determined as a multi-dimensional increment to be processed in the next round. The initial multi-dimensional increment may be a system default value, experience value, artificial preset value, etc., or any combination thereof, which is set according to actual requirements.

In some embodiments, the initial candidate irrigation scheme may be obtained by initializing vectors. An exemplary process for initializing vectors is as follows: for several greenspaces (assuming the number of greenspaces is D), the number of initial candidate irrigation schemes may be set as N, meanwhile, the dimension of the each initial candidate irrigation scheme is D (each dimension corresponds to the irrigation water amount of a greenspace), a vector $X_i^0$ corresponding to the $i^{th}$ initial candidate irrigation scheme may be denoted as:

$$(X_{i1}^0, X_{i2}^0, \ldots, X_{iD}^0),$$

the vector corresponding to the N initial candidate irrigation schemes may be denoted as:

$$(X_{11}^0, X_{12}^0, \ldots, X_{1D}^0), (X_{21}^0, X_{22}^0, \ldots, X_{2D}^0), \ldots, (X_{N1}^0, X_{N2}^0, \ldots, X_{ND}^0)).$$

where 0 is the identifier (representing the $0^{th}$ round of iteration, i.e., an initial value that has not yet started the iteration), i is the number of the candidate irrigation scheme, i≤N.

In each subsequent round of iteration, the multi-dimensional increment to be processed of the round is updated to obtain the updated multi-dimensional increment. The candidate irrigation scheme to be processed is updated based on the updated multi-dimensional increment to obtain the updated candidate irrigation scheme. The obtained candidate irrigation scheme after the update is determined as the candidate irrigation scheme to be processed in the next round, and the updated multi-dimensional increment is determined as the multi-dimensional increment to be processed in the next round.

In some embodiments, updating the multi-dimensional increment to be processed may be realized by updating an increment element to be processed. The increment element is an element of each dimension of the multi-dimensional increment, and the multi-dimensional increment may include a plurality of increment elements. There may be a correspondence between each greenspace and each increment element in the candidate irrigation scheme to be processed. The increment element may be used to represent the adjustment range of the irrigation water amount for the corresponding greenspace.

In some embodiments, the increment element to be processed may be updated based on current loss in the previous round, and the updated increment element is used as the increment element to be processed of the next round. The current loss in the previous round may be determined based on a difference between the candidate irrigation water amount elements obtained in the previous round and the historical optimal candidate irrigation parameters.

Exemplarily, after the k+1 round of iteration, the updated increment element may be calculated through the following formula (1):

$$v_{id}^{k+1} = \omega v_{id}^k + c_1 r_1((p_{id,pbest}^k - X_{id}^{k+1}) + c_2 r_2((p_{d,gbest}^k - X_{id}^k)) \quad (1),$$

where i denotes the number of the candidate irrigation scheme, i≤N, d denotes the number of the greenspace, d≤D. k denotes the number of iteration rounds, k≥0. $v_{id}^k$ denotes the increment element to be processed after the $k^{th}$ iteration of the $i^{th}$ candidate irrigation scheme. $X_{id}^k$ denotes the $i^{th}$ candidate irrigation scheme obtained after the $k^{th}$ iteration. ω denotes the inertia weight constant. $c_1$ denotes an individual learning factor, $c_2$ denotes a group learning factor. $r_1$ and $r_2$ are arbitrary values within the interval [0,1] to increase the randomness of the search. After the $k^{th}$ round of iteration, $p_{id,pbest}^k$ is a value of the optimal solution of the $i^{th}$ candidate irrigation scheme during the previous iterations in the $d^{th}$ greenspace. The optimal solution at this time may refer to after the $k^{th}$ round of iteration, when the growth promotion value of a candidate irrigation scheme is the maximum value among the plurality of growth promotion values corresponding to the previous iterations, the irrigation water amount collection of the each greenspace corresponding to the candidate irrigation scheme (i.e., an individual historical optimal solution). $p_{d,gbest}^k$ is a value of the optimal solution of all N candidate irrigation schemes in the $d^{th}$ greenspace after the kth round of iteration. The optimal solution at this time may refer to after the $k^{th}$ round of iteration, among the aforementioned plurality of candidate irrigation schemes with the greatest growth promotion value in the previous iterations, the irrigation water amount collection (i.e., the group historical optimal solution) of the each greenspace corresponding to the candidate irrigation scheme with the largest growth promotion value.

The inertia weight constant ω, the individual learning factor $c_1$, the group learning factor $c_2$, and the arbitrary values $r_1$ and $r_2$ may be system default value, experience values, artificial preset values, etc., or any combination thereof, which are set according to actual requirements.

In some embodiments, the maximum absolute value of the increment element in each iteration may be $v_{max}$, i.e., denoting the maximum adjustment range of irrigation water amount for each greenspace. In the k+1 round of iteration, the multi-dimensional increment $V_i$ formed by the adjustment range of irrigation water amount for the each greenspace may be expressed as $(v_{i1}, v_{i2}, \ldots, v_{iD})$. The vectors of multi-dimensional increments corresponding to N candidate irrigation schemes may be denoted as $((v_{11}, v_{12}, \ldots, v_{1D}), (v_{21}, v_{22}, \ldots, v_{2D}), \ldots, (v_{N1}, v_{N2}, \ldots, v_{ND}))$ The value of any increment element in the vector may be negative, but the absolute value is not greater than $v_{max}$.

In some embodiments, each candidate irrigation scheme to be processed may be updated based on increment element in the updated multi-dimensional increment. Exemplarily, after the k+1 round of iteration, the updated candidate irrigation scheme may be calculated through the following formula (2):

$$X_{id}^{k+1} = X_{id}^k + v_{id}^{k+1} \quad (2).$$

For example, after the first round of iteration, the updated candidate irrigation scheme may be calculated through the following formula (3):

$$X_i^1 = (X_{i1}^1, X_{i2}^1, \ldots, X_{iD}^1) = (X_{i1}^0 + v_{i1}^1, X_{i2}^0 + v_{i2}^1, \ldots, X_{iD}^0 + v_{iD}^1) \quad (3),$$

the vector representation corresponding to the N updated candidate irrigation schemes may be calculated through the following formula (4):

$$(X_1^1, X_2^1, \ldots, X_N^1) = ((X_{11}^1, X_{12}^1, \ldots, X_{1D}^1), (X_{21}^1, X_{22}^1, \ldots, X_{2D}^1), \ldots, (X_{N1}^1, X_{N2}^1, \ldots, X_{ND}^1)) = ((X_{11}^0 + v_{11}^1, X_{12}^0 + v_{12}^1, \ldots, X_{1D}^0 + v_{1D}^1), (X_{21}^0 + v_{21}^1, X_{22}^0 + v_{22}^1, \ldots, X_{2D}^0 + v_{2D}^1), \ldots, (X_{N1}^0 + V_{N1}^1, X_{N2}^0 + V_{N2}^1, \ldots, X_{ND}^0 + V_{ND}^1)) \quad (4).$$

In some embodiments, in each round of iterative updation of the candidate irrigation scheme, the total irrigation water amount Q of all greenspaces (i.e., the sum of the vector values of all dimensions) may have restriction:

$$Q = \Sigma(X_{id}) = (X_{i1} + X_{i2} + X_{i3}, \ldots, + X_{iD}) \leq S,$$

where S denotes the preset total amount of the irrigation.

In some embodiments, if after an iteration, the value of the total irrigation water amount Q corresponding to the candidate irrigation parameters in the candidate irrigation scheme is greater than S, the irrigation water amount of the each greenspace in the candidate irrigation scheme may be reduced according to a ratio (S/Q). For example, after the fourth iteration, the total irrigation water amount corresponding to the ninth candidate irrigation scheme $X_9^4 = (X_{91}^4, X_{92}^4, \ldots, X_{9D}^4)$ is:

$$Q^4 = X_{91}^4 + X_{92}^4 + X_{93}^4, \ldots, X_{9D}^4 > S,$$

and the $X_9^4$ is reduced to:

$$X_9^4 = ((S/Q^4)X_{91}^4, (S/Q^4)X_{92}^4, \ldots, (S/Q^4)X_{9D}^4).$$

In some embodiments, the candidate irrigation scheme may be iteratively updated through the above preset algorithms until satisfying the preset conditions, and the iterative updation ends. The preset condition may be that the preset value is reached, or the ratio of the growth promotion value obtained by algorithms to the preset theoretical maximum growth promotion value is greater than the threshold.

The plurality of candidate irrigation schemes after iteratively updating converge to a target irrigation scheme. The target irrigation scheme includes a set of target irrigation parameters for irrigating the each greenspace within the first future time period. At this time, the growth promotion value corresponding to the target irrigation scheme should be the maximum value of the growth promotion values corresponding to the plurality of candidate irrigation schemes updated in previous iterative updations.

Some embodiments of the present specification may continuously update the plurality of candidate irrigation schemes through a way of iteration, and continuously optimize the candidate irrigation schemes. In this way, the target irrigation scheme with the greatest growth promotion value is determined, and the greenspace can further achieve the best growth condition while saving irrigation water.

FIG. 9 is another exemplary flowchart for determining target irrigation parameters according to some embodiments of the present disclosure. As shown in FIG. 9, a process 900 may include the following steps.

Step 910, the urban management platform obtains the preset total amount of irrigation in the target area within the first future time period.

Step 920, the urban management platform determines the plurality of candidate irrigation schemes of the plurality of greenspaces based on the preset total amount of irrigation and the first growth information corresponding to each greenspace, and each candidate irrigation scheme includes a set of candidate irrigation parameters for irrigation of each green land.

Step 930, the urban management platform determines the target environment information of the each greenspace within the second future time period.

The target environment information may refer to the environment information within the second future time period. Similar to the historical environment information, the target environment information may include a rainfall, air temperature, humidity, light intensity, wind power, etc. of the area where the greenspace is located within the second future time period. The urban management platform may obtain the target environment information through the sensor network platform.

Step 940, for the each candidate irrigation scheme, after irrigating the plurality of greenspaces based on the candidate irrigation scheme, the urban management platform determines the second growth information of the each greenspace within the second future time period through the growth condition prediction model based on the candidate irrigation scheme, the target environment information, and the first growth information.

For the each candidate irrigation scheme, the irrigation parameters, target environment information, and first growth information corresponding to the candidate irrigation scheme of a greenspace may be input into the growth condition prediction model, and the output of the growth condition prediction model may be the second growth information of the greenspace.

Step 950, the urban management platform determines the growth promotion value corresponding to the candidate irrigation scheme based on the second growth information of each greenspace.

Step 960, the urban management platform determines the target irrigation scheme of the plurality of greenspaces based on the growth promotion value corresponding to the each candidate irrigation scheme.

The urban management platform may determine the candidate irrigation scheme corresponding to a maximum growth promotion value as the target irrigation scheme.

In some embodiments of the present disclosure, the growth condition prediction model is configured to compare the plurality of candidate irrigation schemes, determine a candidate irrigation scheme with more growth promotion value as the target irrigation scheme from the plurality of candidate irrigation schemes by considering from a next future time period in a longer-term. Under the condition of ensuring the normal growth of the greenspace, more scientific target irrigation parameters may be determined to avoid waste of resources.

It should be noted that the descriptions of the above processes is merely provided for the purposes of illustration, and not intended to limit the scope of the present disclosure. For those skilled in the art, multiple variations and modifications may be made to the processes under the teachings of the present disclosure. However, those variations and modifications may be within the scope of the protection of one or more embodiments of the present disclosure.

The basic concepts have been described above. Obviously, for those skilled in the art, the above-detailed disclosure is merely an example and does not constitute a limitation of the present disclosure. Although there is no clear explanation here, those skilled in the art may make various modifications, improvements, and modifications of the present disclosure. This type of modification, improvement, and corrections are recommended in the present disclosure, so this class is corrected, improved, and the amendment remains in the spirit and scope of the exemplary embodiment of the present disclosure.

Meanwhile, the present disclosure uses specific words to describe embodiments of the present specification. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software-only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters set forth in the description and attached claims are approximations that may vary depending upon the desired properties sought to be obtained by a particular embodiment. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication, and other materials referenced by the present disclosure, such as articles, books, instructions, publications, documentation, etc., hereby incorporated herein by reference. Except for the application history documentation of the present specification or conflict, there is also an except for documents (currently or after the present disclosure) in the widest range of documents (currently or later). It should be noted that if the description, definition, and/or terms used in the appended materials of the present disclosure is inconsistent or conflicts with the content described in the present disclosure, the use of the description, definition, and/or terms of the present disclosure shall prevail.

Finally, it should be understood that the embodiments described herein are only configured to illustrate the principles of the embodiments of the present disclosure. Other deformations may also belong to the scope of this disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A distribution method for greenspace irrigation water of a smart city based on an Internet of Things, wherein the distribution method is performed by an urban management platform, comprising:

obtaining historical monitoring information of a plurality of greenspaces in a target area within a historical time period from an urban monitoring object platform through a sensor network platform; determining historical growth information of the plurality of greenspaces within the historical time period based on the historical monitoring information of the plurality of greenspaces;

for each greenspace, obtaining historical irrigation parameters of a greenspace within the historical time period through an irrigation object platform and obtaining historical environment information of the greenspace within the historical time period through the urban monitoring object platform; determining first growth information of the greenspace within a first future time period through a growth condition prediction model based on the historical growth information, the historical irrigation parameters, and the historical environment information; wherein the growth condition prediction model is obtained by training an initial growth prediction model based on a plurality of sets of training samples with labels, and the training samples include sample growth information, sample irrigation parameters, and sample environment information of sample greenspaces within a first sample time period, the labels are growth information of the sample greenspaces within a second sample time period, and the first sample time period is earlier than the second sample time period;

obtaining a preset total amount of irrigation in the target area within the first future time period; and determining target irrigation parameters combined corresponding to the each greenspace with a preset algorithm based on the preset total amount of irrigation and the first growth information of the each greenspace, wherein the preset algorithm includes at least one round of iterative updation, and one round in the at least one round of iterative updation includes:

updating a multi-dimensional increment to be processed to obtain a multi-dimensional increment after a current round of iterative updation; determining the multi-dimensional increment after the current round of iterative updation as the multi-dimensional increment to be processed in a next round, wherein the multi-dimensional increment includes a plurality of increment elements corresponding to the plurality of greenspaces and each increment element of the plurality of increment elements represents an adjustment range of irrigation water amount for the corresponding greenspace; and updating an increment element to be updated in the multi-dimensional increment to be processed including:

updating the increment element to be updated based on a current loss in a previous round, wherein the current loss in the previous round is determined based on a difference between candidate irrigation water amount elements obtained in the previous round and a historical optimal candidate irrigation parameter; and for candidate irrigation parameters to be processed in the greenspace of the plurality of greenspaces of the candidate irrigation schemes to be processed, updating the candidate irrigation parameters to be processed based on an updated increment element corresponding to the greenspace in the multi-dimensional increment after the current round of iterative updation to obtain the candidate irrigation schemes after the current round of iterative updation, wherein the candidate irrigation schemes after the current round of iterative updation are determined as the candidate irrigation schemes to be processed in the next round;

if a total amount of irrigation of the plurality of greenspaces in the candidate irrigation schemes after the current round of iterative updation is greater than the preset total amount of irrigation, reducing the irrigation water amount of the each greenspace in the candidate irrigation schemes after the current round of iterative updation according to a ratio, wherein the ratio is determined based on a ratio of the total amount of irrigation of the plurality of greenspaces to the preset total amount of irrigation;

generating an irrigation control instruction for the each greenspace based on the target irrigation parameters;

and sending the irrigation control instruction to the irrigation object platform through the sensor network platform, wherein the irrigation object platform is configured to irrigate the each greenspace in response to the irrigation control instruction.

2. The distribution method of claim 1, wherein the determining the target irrigation parameters of the each greenspace within the first future time period based on the first growth information corresponding to the each greenspace includes:

obtaining the preset total amount of irrigation in the target area within the first future time period;

determining the plurality of candidate irrigation schemes of the plurality of greenspaces based on the preset total amount of irrigation and the first growth information corresponding to the each greenspace, wherein each candidate irrigation scheme includes a set of candidate irrigation parameters for irrigating the each greenspace;

determining a target environment information of the each greenspace within a second future time period;

for the each candidate irrigation scheme, after irrigating the plurality of greenspaces based on a candidate irrigation scheme, determining second growth information of the each greenspace within the second future time period through the growth condition prediction model after the plurality of irrigation of greenspaces are irrigated based on the candidate irrigation schemes based on the candidate irrigation scheme, the target environment information, and the first growth information;

determining growth promotion value corresponding to the candidate irrigation scheme based on the second growth information of the each greenspace; and determining a target irrigation scheme of the plurality of greenspaces based on the growth promotion value corresponding to the each candidate irrigation scheme, wherein the target irrigation scheme includes a set of target irrigation parameters for irrigating the each greenspace within the first future time period.

3. A distribution system for greenspace irrigation water of a smart city based on an Internet of Things, wherein the distribution system includes a user platform, a service platform, an urban management platform, a sensor network platform, an urban monitoring object platform, and an irrigation object platform, and the urban management platform is configured to perform operations, including:

obtaining historical monitoring information of a plurality of greenspaces in a target area within a historical time period from the urban monitoring object platform through the sensor network platform;

determining historical growth information of the plurality of greenspaces within the historical time period based on the historical monitoring information of the plurality of greenspaces;

for each greenspace, obtaining historical irrigation parameters of a greenspace within the historical time period through the irrigation object platform and obtaining historical environment information of the greenspace within the historical time period through the urban monitoring object platform;

determining first growth information of the greenspace within a first future time period through a growth condition prediction model based on the historical growth information, the historical irrigation parameters, and the historical environment information; wherein the growth condition prediction model is obtained by training an initial growth prediction model based on a plurality of sets of training samples with labels, and the training samples include sample growth information, sample irrigation parameters, and sample environment information of sample greenspaces within a first sample time period, the labels are growth information of the sample greenspaces within a second sample time period, and the first sample time period is earlier than the second sample time period;

obtaining a preset total amount of irrigation in the target area within the first future time period; and determining target irrigation parameters combined corresponding to the each greenspace with a preset algorithm based on the preset total amount of irrigation and the first growth information of the each greenspace, wherein the preset algorithm includes at least one round of iterative updation, and one round in the at least one round of iterative updation includes:

updating a multi-dimensional increment to be processed to obtain a multi-dimensional increment after a current round of iterative updation; determining the multi-dimensional increment after the current round of iterative updation as the multi-dimensional increment to be processed in a next round, wherein the multi-dimensional increment includes a plurality of increment elements corresponding to the plurality of greenspaces and each increment element of the plurality of increment elements represents an adjustment range of irrigation water amount for the corresponding greenspace; and updating an increment element to be updated in the multi-dimensional increment to be processed including:

updating the increment element to be updated based on a current loss in a previous round, wherein the current loss in the previous round is determined based on a difference between candidate irrigation water amount elements obtained in the previous round and a historical optimal candidate irrigation parameter; and for candidate irrigation parameters to be processed in the greenspace of the plurality of greenspaces of the candidate irrigation schemes to be processed, updating the candidate irrigation parameters to be processed based on an updated increment element corresponding to the greenspace in the multi-dimensional increment after the current round of iterative updation to obtain the candidate irrigation schemes after the current round of iterative updation, wherein the candidate irrigation schemes after the current round of iterative updation are determined as the candidate irrigation schemes to be processed in the next round;

if a total amount of irrigation of the plurality of greenspaces in the candidate irrigation schemes after the current round of iterative updation is greater than the preset total amount of irrigation, reducing the irrigation water amount of the each greenspace in the candidate irrigation schemes after the current round of iterative updation according to a ratio, wherein the ratio is determined based on a ratio of the total amount of irrigation of the plurality of greenspaces to the preset total amount of irrigation;

generating an irrigation control instruction for irrigating the each greenspace based on the target irrigation parameters; and sending the irrigation control instruction to the irrigation object platform through the sensor network platform, wherein the irrigation object platform is configured to irrigate the each greenspace in response to the irrigation control instruction.

4. The distribution system of claim 3, wherein the urban management platform is configured to further perform the operations including:

obtaining the preset total amount of irrigation in the target area within the first future time period;

determining the plurality of candidate irrigation schemes of the plurality of greenspaces based on the preset total amount of irrigation and the first growth information corresponding to the each greenspace, wherein each candidate irrigation scheme includes a set of candidate irrigation parameters for irrigating the each greenspace;

determining a target environment information of the each greenspace within a second future time period;

for the each candidate irrigation scheme, after irrigating the plurality of greenspaces based on a candidate irrigation scheme, determining second growth information of the each greenspace within the second future time period through the growth condition prediction model after the plurality of irrigation of greenspaces are irrigated based on the candidate irrigation schemes based on the candidate irrigation scheme, the target environment information, and the first growth information;

determining growth promotion value corresponding to the candidate irrigation scheme based on the second growth information of the each greenspace; and determining a target irrigation scheme of the plurality of greenspaces based on the growth promotion value corresponding to the each candidate irrigation scheme, wherein the target irrigation scheme includes a set of target irrigation parameters for irrigating the each greenspace within the first future time period.

* * * * *